Nov. 22, 1960  J. F. RAYFIELD ET AL  2,961,204
DECELERATION DEVICE
Filed Jan. 23, 1958  2 Sheets-Sheet 2
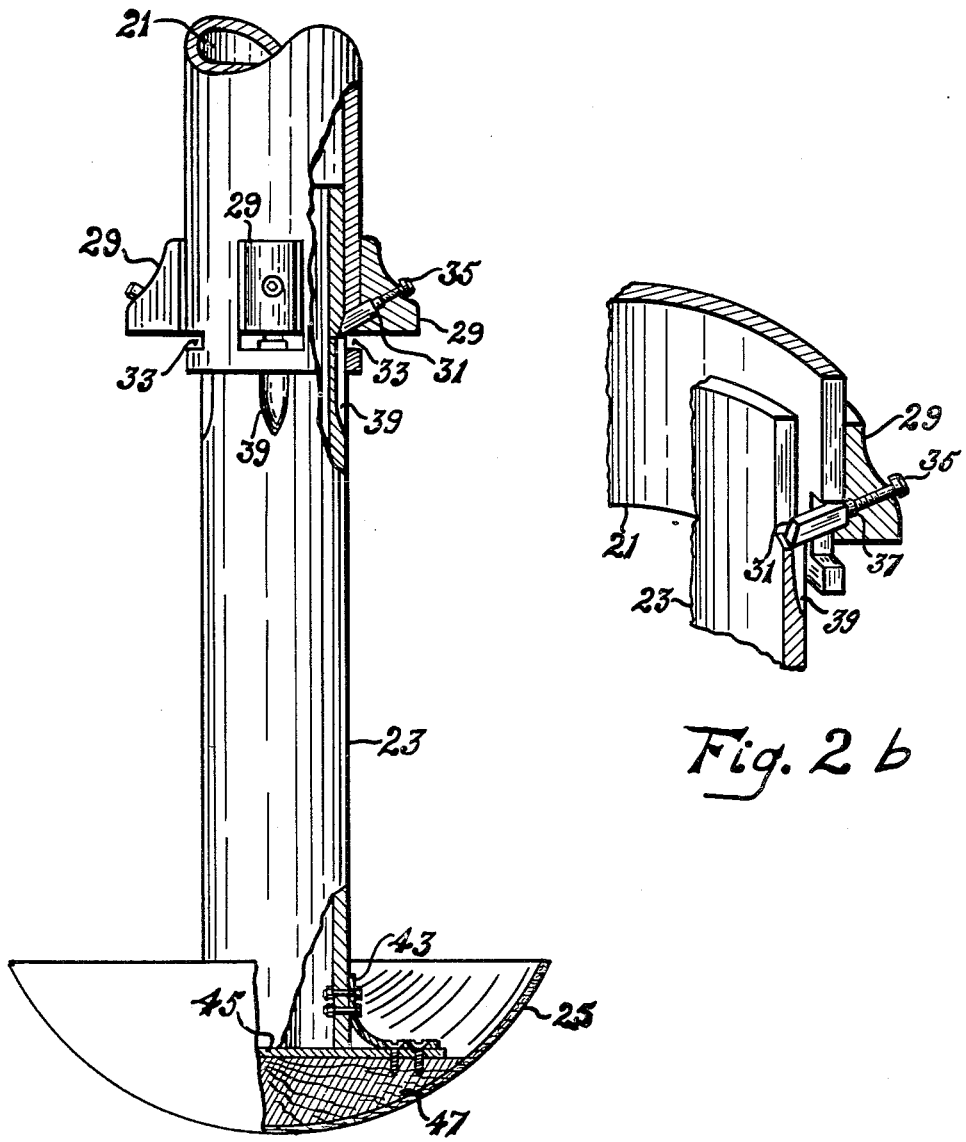
INVENTORS
JOHN F. RAYFIELD
& RICHARD L. GEER
BY
ATTORNEYS

United States Patent Office 2,961,204
Patented Nov. 22, 1960

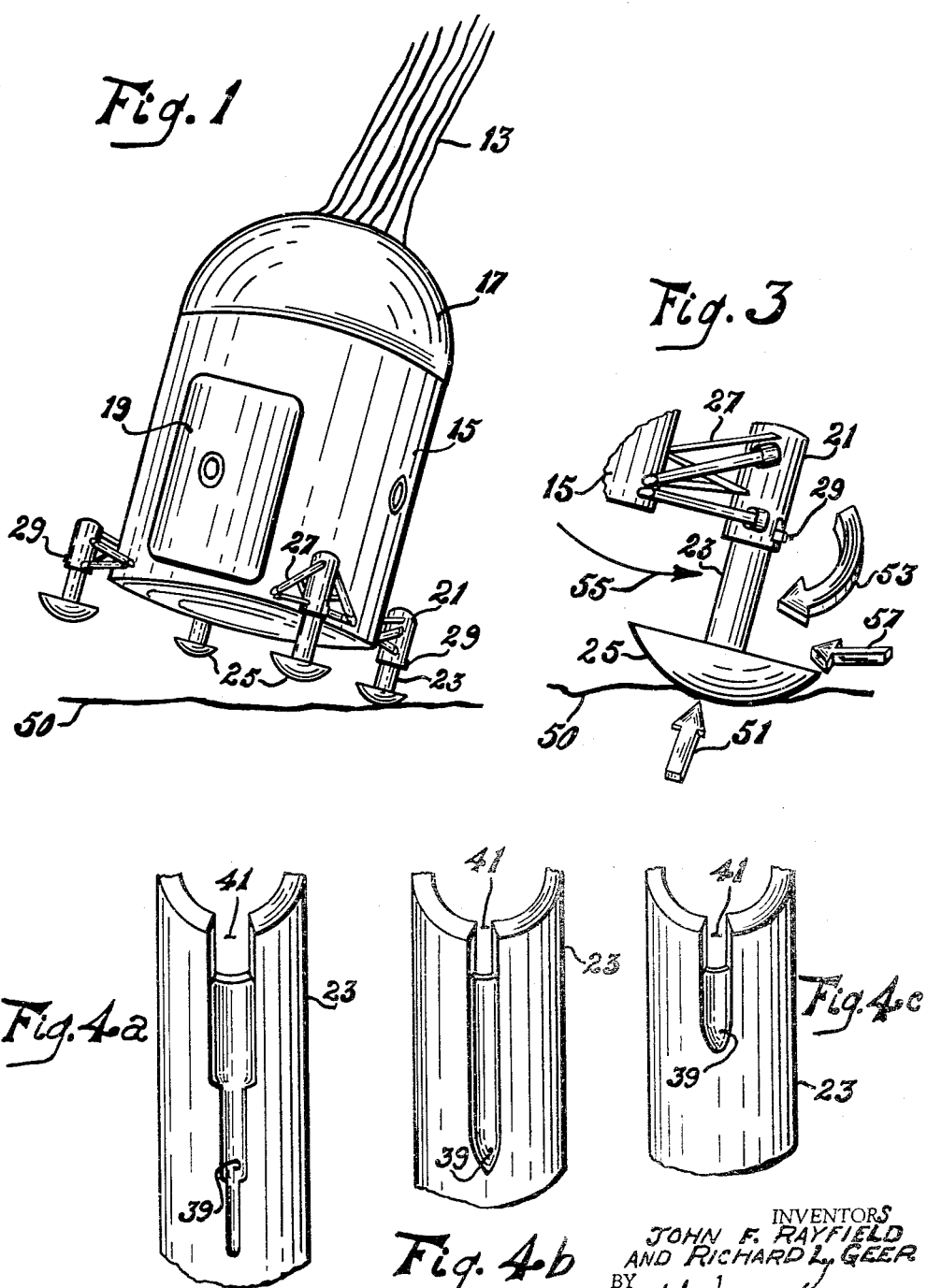

2,961,204
DECELERATION DEVICE

John F. Rayfield, Yellow Springs, and Richard L. Geer, Fairborn, Ohio, assignors to the United States of America as represented by the Secretary of the Air Force Filed Jan. 23, 1958, Ser. No. 710,826

3 Claims. (Cl. 244—138)

(Granted under Title 35, U.S. Code (1952), sec. 266)

The invention described herein may be manufactured and used by or for the United States Government for governmental purposes without payment to us of any royalty thereon.

This invention relates to a means for decelerating a falling object as it lands so that damage to the object, as well as so instruments and persons that may be contained therein, is prevented or substantially reduced. More particularly the invention is concerned with providing a simple means for absorbing the kinetic energy of a balloon gondola which has been released from its carrier balloon and is parachuting back to earth. On impact with the ground the kinetic energy of the gondola must be absorbed at rates commensurate with the safety of the gondola structure and possible human occupants.

Various methods have been used and proposed for absorbing shock and facilitating the safe landing of parachute-borne cargoes. Most common among these methods is by the elastic deformation of some material. The use of coil springs and other types of shock absorbers is customary in the attempt to safely decelerate a falling body. Metering the flow of fluid as in oleo shock absorbers or air bags is another method of solving the problem of deceleration without damaging the falling body or its contents. Most of the above named methods also require more or less elaborate packaging of the cargo in order to prevent damage caused by bouncing after landing.

The deceleration device described herein overcomes the disadvantages of the above named methods. For example, the shock absorbing properties of oleo-decelerating devices vary greatly depending on the prevailing temperature at the time and place of the drop. Also, as previously stated, in the coil spring type of shock absorber, considerable bouncing is inevitable, resulting in possible damage and injury to the occupants or contents of dropped object.

Accordingly, it is a primary object of the present invention to provide a means for safely decelerating a falling or parachuting object thereby minimizing damage to delicate instruments or occupants which may be contained therein.

Another object of the invention is to provide a decelerating device for a falling object which is non-reversible and therefore does not result in bouncing or rebounding after landing thus preventing loss or injury to the object or its contents.

Still another object of the invention is to provide a decelerating device which operates independently of temperature conditions and does not depend on the viscosity of a fluid which varies under particular operating conditions.

Still another object of the invention is to provide an improved landing gear for free falling or parachuting objects which is capable of safely handling loads up to several hundred pounds and still provide sufficient protection to prevent damage to the object or its contents.

A particular advantage of using the invention instead of other known deceleration devices is that the rate of deceleration is easily controlled by simple mechanical adjustments. Also, a device constructed according to this invention is simpler to manufacture and is more reliable and effective in its operation. A simple replacement of one of the components places the device in condition for immediate reuse.

These and other objects, features and advantages will become more apparent after considering the following detailed description taken in connection with the annexed drawings wherein:

Fig. 1 is a view of a gondola landing after having been released from a balloon and parachuted back to earth;

Fig. 2a is a detailed view of one of the legs of the gondola showing the foot and cutter installation on the landing gear;

Fig. 2b is a cross-sectional enlarged view of one of the cutter assemblies showing the position of the cutter and starting notch;

Fig. 3 shows the direction of various forces which may act on the leg on landing as shown in Fig. 1; and Figs. 4a, 4b, and 4c show a variety of shapes of starting notches for controlling the time and rate of onset of deceleration.

Referring now to Fig. 1, there is shown a view of the gondola, with parachute shroud lines 13 attached, landing after having been released from its carrier balloon. The parachute shroud lines 13 are securely attached to the gondola framework. The gondola itself includes a shell portion 15 and is covered by an aerodynamic fairing 17. A hatch 19 through which cargo or passengers may enter and leave is included in the shell portion 15 of the gondola.

The landing gear, which is the most important part of the invention, comprises a restraint tube 21, a tubular leg 23, and a Fiberglas foot 25. The struts 27 are useful to attach the landing gear to the gondola shell and frame.

A detailed view of the landing gear is shown in Fig. 2a with cutaway portions showing a sectional view of the cutter mechanism. The inside diameter of the restraint tube 21 is slightly larger in diameter than the outside diameter tubular leg 23 so that the latter is slidable into the restraint tube 21. In Fig. 2b, an enlarged view of the cutter assembly shows, attached to the side of the tube 21, a tool or cutter holder 29 designed to hold the cutter 31. The restraint tube 21 is provided with an elongated opening 33 for allowing cutter 31 to contact leg 23 and to permit removal of chips which have been separated from the leg member 23.

An Allen bolt 35 is used to adjust the depth of cut, thereby determining the amount of metal removed and rate of deceleration of the dropped gondola. Washers 37 are included to position the cutter 31 against the cutter holder 29. Starting notches or grooves 39 are premachined in the wall of the leg member 23 in order to control the rate of onset of deceleration. The specific configuration, including the width and depth, of these grooves is useful as a means for allowing the cutter 31 to approach its maximum depth of cut at various parts of the deceleration cycle depending upon the weight and velocity of the falling gondola. A clearance groove 41 is also provided in the leg member 23 so that it can slide past the cutter 31 which has been affixed to the holder 29 on the restraint tube 21.

The Fiberglas foot 25 is attached to the leg member 23 by means of the bracket 43. An aluminum pad 45 is inserted under the leg 23 and held in position by the bracket 43 which also serves to attach the whole leg assembly to a wooden pad 47 that is shaped to fit the inner contour of the Fiberglas foot 25.

The landing gear is loaded by sliding the leg member 23 into the restraint tube 21, the cutters 31 having previously been set to the desired depth of cut. The cutters 31 ride in the clearance grooves 41 until the starting notch 39 is reached. Shown in Figs. 4a, 4b, and 4c are views of some typical starting notches which act to control the rate of onset of deceleration and absorbtion of the kinetic energy. The leg 23 is pinned into place when the gondola is at rest by soft metal shear pins (not shown which pass through the restraint tube 21 and the leg 23 thereby preventing the legs from dropping off in flight.

As the feet 25 of the gondola touch the ground 50, the shear pin is severed and the restraint tube 21 starts to move down the tubular leg 23 which has stopped its vertical movement with respect to the ground. The cutters 31 engage the starting notches 39 on the leg 23 and the decelerating cycle begins. Grooves are cut along the length of the leg 23 until the kinetic energy of the gondola is absorbed and the gondola brought to rest.

In Fig. 3 there is shown, diagrammatically, the forces which act as the gondola hits. The primary force 51 is, of course, vertical. The legs 23 resist this force in two ways: first, they move upward relative to the restraint tube 21 which is securely attached to the gondola and the cutters 31 resist this movement by machining grooves in the legs 23. Secondly, the legs 23 act as columns (long members under compression) and, since they are tubular and their uniform distribution of mass is away from the center line, they are most efficient in resisting the moment force 53.

As the gondola with its attached parachute drops a swinging or oscillating motion will probably develop. This may be due to a prevailing ground wind or to the natural oscillation caused by the parachute system itself. In either event, when the gondola contacted the ground 50 the motion would be in the direction shown by the arrow 55, Fig. 3. Upon impact, the leg would slide across the ground causing a frictional force 57 to resist the sliding. In order to reduce the sliding friction, the leg 23 is provided with rounded Fiberglas feet 25 which tend to slide over rough ground and distribute the landing load more evenly. Also, the moment 53 about the support will result due to this unavoidable ground friction. This will, however, be resisted by the tubular leg member 23, which is a relatively efficient structure for taking the bending moment 53.

To prevent too rapid a deceleration, as would result from all four legs contacting simultaneously with the legs set for 10 g deceleration, the starting notches shown in Figs. 4a, 4b, and 4c are premachined in the leg members 23, thus providing lower initial resistance on the cutting stroke. Therefore, two legs cutting full length will provide 10 g deceleration or four legs cutting half length will provide the same 10 g deceleration.

The invention described herein is not limited in its use to a means for safely dropping a released balloon gondola. Many other practical applications may be made of the device. For example, elevators could be equipped with the invention which would act as a safety device in case of cable failure or some other emergency which would allow the elevator car to drop freely in the shaft. The invention could also be used to decelerate the heavy equipment platforms which may be dropped by parachute from cargo planes during airlift operations.

It will be understood to those skilled in the art that the invention has been described with reference to a particular embodiment only and that various changes and modifications may be made in the device without departing from the true spirit and scope of the invention.

Having thus described our invention, what we claim as new and desire to secure by Letters Patent of the United States is:

1. A deceleration device for absorbing the kinetic energy of a falling object comprising a pair of telescoping tubes movable relatively to each other, the outer of said tubes fixed to the lower portion of said falling object, the inner of said tubes provided with a substantially hemispherical foot portion adapted to contact the ground in advance of said falling object, and cutter means fixed to said outer tube and arranged upon relative movement between said tubes to engage grooves on the outer surface of said inner tube, said grooves being of varying dimensions for controlling the rate of onset of deceleration of the falling object by regulating the shape and depth of the material removed from the wall of said inner tube.

2. The deceleration device described in claim 1 wherein said hemispherical foot portion is provided with a wooden pad upon which said inner tube is mounted, said pad acting to reduce the initial shock of ground contact.

3. A deceleration device for absorbing the kinetic energy of a falling object comprising a pair of telescoping tubes movable relatively to each other, the outer of said tubes fixed to the lower portion of said falling object, the inner of said tubes being positioned to contact the ground in advance of said falling object, a longitudinally disposed groove in the outer wall of said inner tube, and cutter means fixed to said outer tube and extending into said groove, said groove having predetermined dimensional variations along its length to control the resistance to the movement of said cutter means at any point along the length of the groove by controlling the amount of material to be removed by said cutter means thereby controlling the deceleration rate of said object when said inner tube and outer tube are moved relative to each other.

References Cited in the file of this patent

UNITED STATES PATENTS

| | | |
|---|---|---|
| 2,401,748 | Dillon | June 11, 1946 |
| 2,501,559 | Winzen et al. | Mar. 21, 1950 |
| 2,557,105 | Hight | June 19, 1951 |
| 2,837,176 | Dropkin | June 3, 1958 |
| 2,877,170 | Greenhalgh et al. | Mar. 10, 1959 |

FOREIGN PATENTS

| | | |
|---|---|---|
| 1,105,404 | France | June 29, 1955 |